United States Patent
Vorsteher et al.

(10) Patent No.: US 7,325,670 B2
(45) Date of Patent: Feb. 5, 2008

(54) CONVEYOR PAN

(75) Inventors: Dirk Vorsteher, Bielefeld (DE);
Gerhard Merten, Lunen (DE); Frank Fischer, Lunen (DE); Jorg Wirtz, Hattingen (DE); Siegfried Schmidt, Bottrop (DE); Martin Broszat, Nordkirchen (DE); Alfred Hefferan, Venetia, PA (US); John Cobley, Farnsfield (GB); Alister McAndrew, Belper (GB); Olaf Losbrodt, Herne (DE)

(73) Assignee: DBT GmbH, Lunen (DE)

( * ) Notice: Subject to any disclaimer, the term of this patent is extended or adjusted under 35 U.S.C. 154(b) by 0 days.

(21) Appl. No.: 10/633,784

(22) Filed: Aug. 4, 2003

(65) Prior Publication Data

US 2004/0026216 A1 Feb. 12, 2004

(30) Foreign Application Priority Data

Aug. 8, 2002 (DE) ................ 102 36 584

(51) Int. Cl.
*B65G 19/28* (2006.01)

(52) U.S. Cl. ................ 198/735.2; 198/735.6
(58) Field of Classification Search ........... 198/735.2, 198/735.4, 735.6, 735.3
See application file for complete search history.

(56) References Cited

U.S. PATENT DOCUMENTS

| | | | |
|---|---|---|---|
| 4,373,757 A * | 2/1983 | Gehle et al. ........... | 299/43 |
| 5,131,724 A * | 7/1992 | Bandy et al. ........... | 299/43 |
| 5,601,341 A * | 2/1997 | Merten et al. ........... | 299/43 |
| 5,871,216 A | 2/1999 | Sparacino | |
| 5,938,000 A * | 8/1999 | Fischer et al. ........... | 198/735.4 |
| 6,401,912 B1 * | 6/2002 | Bandy, Jr. ........... | 198/735.4 |

FOREIGN PATENT DOCUMENTS

| EP | 0 525 926 A1 | 2/1993 |
|---|---|---|
| GB | 1 350 262 A | 4/1974 |
| GB | 2095195 A * | 9/1982 |

* cited by examiner

*Primary Examiner*—Mark A. Deuble
(74) *Attorney, Agent, or Firm*—Cook, Alex, McFarron, Manzo, Cumming & Mehler, Ltd.

(57) ABSTRACT

The present invention relates to a conveyor pan (110) for underground face or gate conveyors, with a pair of side parts (101) comprising cast parts which include cast vertical arms (113) extending over the height of the bottom run (106) and the top run (107), a lower cast flange arm (111) extending outwards to the rear, a cast foot flange (112) extending inwards onto whose lower side a base plate (104) is welded which closes the bottom run to the bottom, as well as on the end faces cast accepting elements (114) for the means of joining conveyor pans, and with a conveyor pan base (105) preferably comprising a rolled sheet. This has tongue like segments (109) on both long sides, which engage in cut-out slots (135) in the vertical arms (113) of the side parts (101) and are welded to them on the outer of the side parts (101).

8 Claims, 4 Drawing Sheets

CONVEYOR PAN

The present invention relates to a conveyor pan for underground face or gate conveyors, with a pair of side parts comprising cast parts which include cast vertical arms extending over the height of the bottom run and the top run, a lower cast flange arm extending outwards to the rear, a cast foot flange extending inwards onto whose lower side a base plate is welded which closes the bottom run to the bottom, as well as on the end faces cast accepting elements for the means of joining conveyor pans, and with a conveyor pan base.

A previously proposed conveyor pan comprising on the one hand cast parts and on the other rolled parts is generally described in professional circles as a hybrid pan and was proposed in DE 39 05 324 A1. Hybrid pans make do with a restricted number of welded joints since the entire construction of the side part, possibly including the side limiters for the guidance of the scrapers in the bottom run, and the acceptance or toggle pockets, which form parts of the means for joining conveyor pans can be formed as one piece in the casting procedure. Onto the side parts then, only the conveyor pan base and the base plate of the bottom run are welded on. In the previously proposed hybrid pan a machine track is welded onto the side part on the face side and a connecting bracket is welded onto the side part on the spoil side and for the connection of the conveyor pan base the vertical arms on both side parts have a rib on the inside, which extends out as far as the end faces of the foot flange and bears out from the upper profile web of the vertical arm bordering the top run.

It is an aim of the present invention to produce a conveyor pan constructed as a hybrid pan which offers advantages over the previously proposed conveyor pans with respect to its overall weight, the number of the necessary welded joints and the connection of the conveyor pan base.

Accordingly the present invention is directed to a conveyor pan as described in the opening paragraph of the present specification wherein the conveyor pan base has tongue shaped segments on both long sides, which engage in cut-out slots in the vertical arms of the side parts and are welded to them on the outer sides of the side parts. Since the segments engage in the cut-out slots, a more secure and more advantageous production engineering support of the conveyor pan base onto the side parts is achieved, whereby especially in automated production by the combination of the segments long sides and cut-out slots not only a more uniform height position of the conveyor pan base but also a more equal separation of the side parts from each other can be provided.

In a preferred embodiment flange arms are provided with weight reducing depressions on their undersides, so that the overall weight of the corresponding conveyor pan can be held comparatively low in spite of the side parts comprising cast parts.

Alternatively the conveyor pan base is welded to the crown of the inner side of the essentially W-shaped cast vertical arm, and the cast flange arm is provided with weight reducing depressions on its underside. Here also in automated production a more uniformly maintained height of the conveyor pan base above the position of the crown can be provided.

Advantageously the conveyor pan base comprises a rolled sheet.

In a preferred embodiment at least the side part on the face side is provided with a machine track for an extraction machine. The integrated machine track is especially advantageous when the conveyor pan is to be used for a face conveyor. For automated production with low cast moulding and storage costs advantages can also be offered however, by moulding at least the cast parts of all the conveyor pans both for face and also gate conveyors identical to each other.

In an alternative embodiment the machine track is an integral component of the flange arm and is formed from its upper side, consequently it is provided already in the cast part of the side part on the face side. An advantage of a machine track formed on the lower flange arm is that it is supported immediately on the ground and the vertical arm of the side parts then can be made comparatively thin walled.

Advantageously the machine track is an integral component of the vertical arm, which has an end section with a T-shaped cross section and its upper side forms the cross web of the machine track. A suitable conFigureuration caters for an overall shorter form of construction of the conveyor pan and thereby of the entire chain scraper conveyor.

In conveyor pans which are used in underground mining for the conveying of coal or similar, it is known that because of the abrasive characteristics of the material to be conveyed the wear on the side parts in the bottom run is substantially lower than the wear arising in the top run.

In an alternative embodiment side and top profiles are exchangeably welded onto the side parts in the region of the top run, against which the scraper ends are guided in the top run and whose inner sides have a profile shape matched to the scraper ends.

In a preferred embodiment the side and top profiles comprise separate elements whereby the top sides of the top profiles form a machine track.

Advantageously the vertical arms have an end section with a T-shaped cross section or a step or similar, onto which the top profile abuts and is supported.

Preferably the side and top profiles are integral components of a rolled profile with a T-shaped cross section. This rolled profile is exchangeably welded onto the side parts in the region of the top run.

In a preferred embodiment the accepting elements comprise open edge cast pockets. Into these pockets toggle bolts with head thickenings on both ends are inserted.

Advantageously the pockets end flush with the upper end section of the vertical arm and stiffen the side parts over their entire height.

Preferably the side parts are provided with cast vertical ribs for additional stiffening for the accepting pockets.

Advantageously the vertical ribs are provided with cut-outs, onto which lifting eyes or similar are fastened. The cut-outs in the vertical ribs or similar at the same time reduce the overall weight of the cast side parts and consequently also of the conveyor pans formed in hybrid construction.

In a preferred embodiment the vertical arms have an essentially constant thickness over the height of the bottom run and the top run above the foot flange. Especially in the conveyor pans provided with exchangeable side and/or top profiles the thickness of the vertical arm can be substantially less in the region of the top run than its thickness in the region of the bottom run.

Advantageously the crown of the W-shaped vertical arm lies displaced outwards as opposed to the inner end surfaces of the foot flange and of the upper web. Therefore the conveyor pan base forms over the entire width of the conveyor pan the abutment face for the coal or similar to be conveyed and the circulating scrapers.

Preferably the vertical arm section is displaced outwards in the region of the top run as opposed to that in the region of the bottom run by the thickness of the side profile.

Therefore in the top run and in the bottom run identical dimensions exist for the circulating scrapers.

Examples of conveyor pans made in accordance with the present invention will now be explained with reference to the accompanying drawings, in which.

Figure 1:
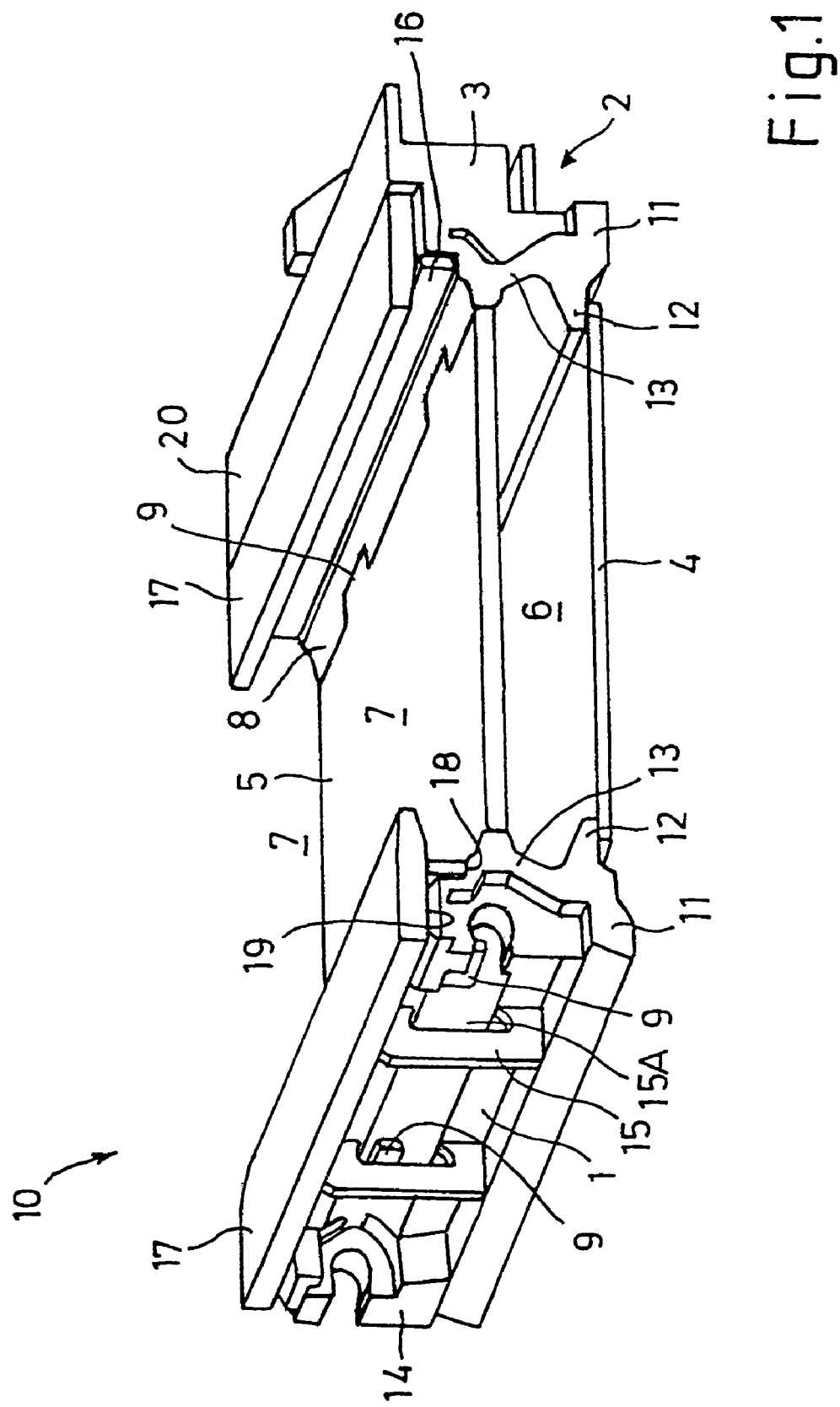
FIG. 1 shows a perspective view of a conveyor pan according to the present invention.

The conveyor pan 10 in FIG. 1 in the embodiment for a face conveyor has a side part 1 on the face side constructed as a cast part and a side part 2 on the spoil side constructed as a cast part, which can be joined via the cast back support 3, only indicated, to the advancing beam of an underground support frame (not shown). As has been previously proposed a base plate 4 is welded and a conveyor pan base 5 is fastened onto each side part 1, 2, whereby the base plate 4 borders on the bottom or return run 6 of a chain scraper conveyor (not shown) and the conveyor pan base 5 borders on the top or conveyor run 7 of a chain scraper conveyor (not shown) on the underside in each case. In a chain scraper conveyor as is known and is not shown, scrapers, which are attached to a scraper chain, circulate, guided by their ends in special profile shapes which are individually formed in the side parts 1, 2. The basic construction of both side parts 1, 2 is therefore practically identical and both side parts 1, 2 comprise a lower flange arm 11, extending outwards to the rear, an inwardly extending cast foot flange 12, on whose underside the base plate 4 is welded, as well as a vertically extending vertical arm 13 extending over the bottom run 6 and the top run 7. As can be well seen from FIG. 1 the inside of the cast vertical arm 13 is provided with a curvature in the section below the conveyor pan base 5, which is matched to the profile shape of the scraper ends and in the region of the bottom run 6 forms the guide for the scrapers. The conveyor pan base 5 itself has on its two long sides 8 four tongue shaped extension segments 9, which engage through cut-out slots in the central section of the vertical arm 13 and are welded onto the outer side of the vertical arm 13 using welded joints, not further illustrated, to the side parts 1, 2. The segments 9 sitting in the cut-out slots support the conveyor pan base 5 on the side parts 1, 2 and the welded connection between the conveyor pan base 5 and the side parts 1, 2, lies in the protected area outside the runs 6, 7. Both side parts 1, 2 have, as can be seen on the side part 1 on the face side, cast acceptance pockets 14 on both end sides in which toggles of the conveyor pan joining means can be laid in for a tensional connection of conveyor pans 10 set one behind the other. The accepting pockets 14 together with the vertical ribs 15, which are provided with weight reducing cut-outs 15A which facilitate the fastening of lifting eyes, stiffen the side parts 1, 2. As a further feature the guiding profiles 16, 17 for the scrapers in the top run 7 are produced as exchangeable wearing parts. For this purpose on the inner sides of the upper sections of the vertical arm 13, side profiles 16 and top profiles 17 formed from wearing rails are welded on. Both the rail shaped side profiles 16 and the top profiles 17 abut steps 18, 19 in the upper section of the vertical arm 13 of the side parts 1, 2. The top profiles 17 are also supported in the vertical direction by vertical ribs 15. The top profiles 17 and the side profile 16 are constructed in such a way that they follow the profile shape of the scraper ends. The upper sides of the top profiles 17 can at the same time form a machine track, which, in the conveyor pan 10 shown in FIG. 1, can be extended further by a horizontal web 20 cast onto the vertical arm 13 of the side part 2 on the spoil side. The flange arms 11 of both side parts 1, 2 are provided with weight reducing cut-outs, not shown, on the under side. The profile shape of the side parts 1, 2 especially the formation of the flange arm 11, the foot flange 12 and the vertical arm 13 can vary without departing from the scope of the attached claims.

Figure 2:
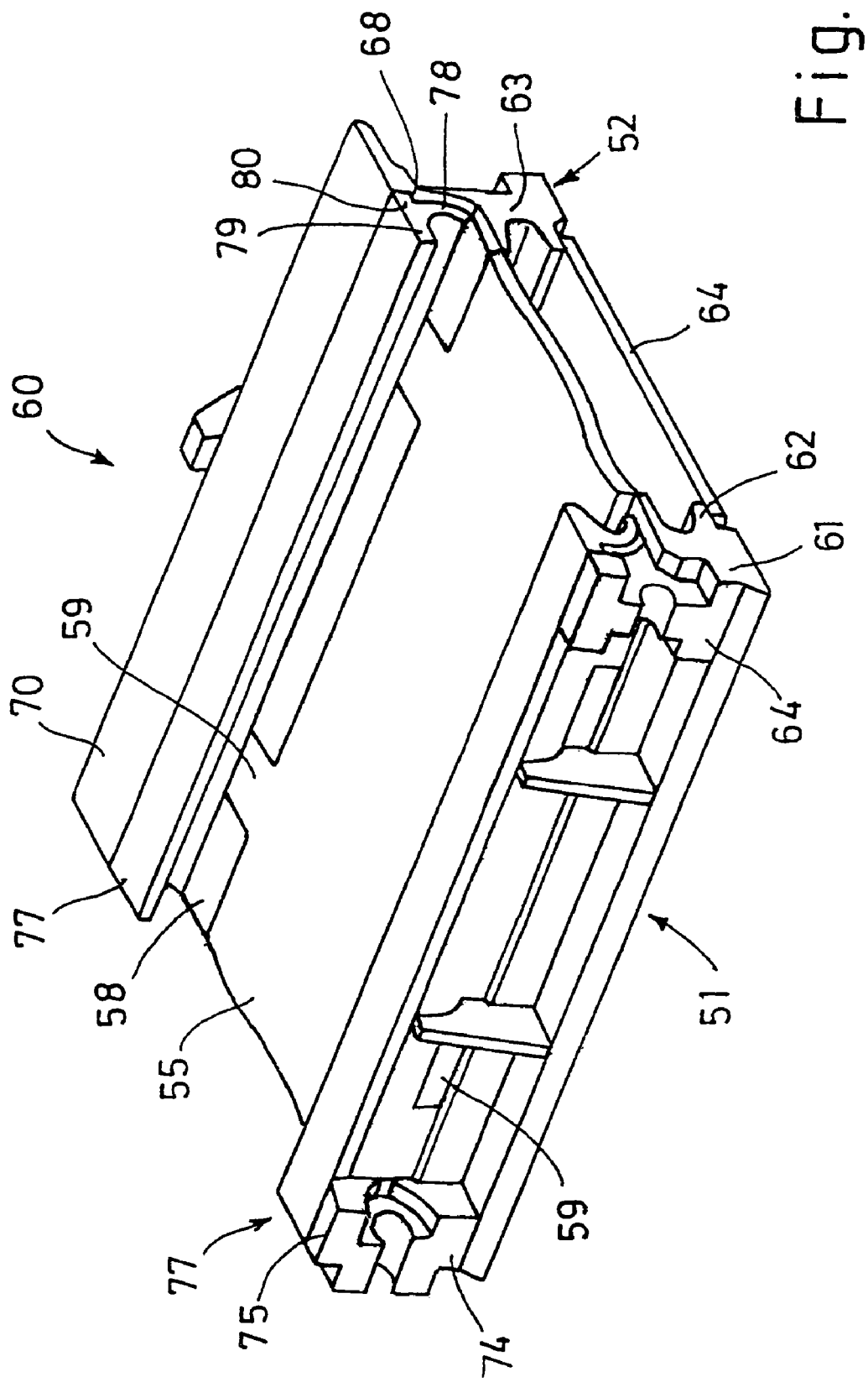
FIG. 2 shows a perspective view of a conveyor pan according to a second embodiment.

FIG. 2 shows a second embodiment of a conveyor pan 60 with side parts 51, 52 comprising cast parts, which in each case include a flange arm 61, a foot flange 62 and a vertical arm 63, whereby a base plate 64 is welded onto the underside of the foot flange 62 and whereby the side parts 51, 52 are joined together by means of a conveyor pan base 55, which has segments 59 on the long sides 58, which engage through cut-out slots in the vertical arm 63 and are welded on the outside to the side parts 51, 52. The top surface 75 of the cast pocket acceptors 74 extend here up to the height of a machine track, which is formed from the top side of the T-shaped side profiles 77. The T-shaped side profiles 77 comprise an almost vertically directed profile web 78 and a horizontally directed cross web 79. A web section 80 on the cross web 79 is supported on a step 68, which is formed on the upper end section of the vertical arm 63. The two T-shaped side profiles 77 formed for instance from rolled profiles can be welded using a long welded seam which can be formed by machine, to the top plate 70 and/or other areas of the cast side parts 51, 52. For the exchange of the side profiles 77 these long welded seams are separated by machine. The profile webs 78 in the region of the segments 59 end immediately above them and possibly cover them.

Figure 3:
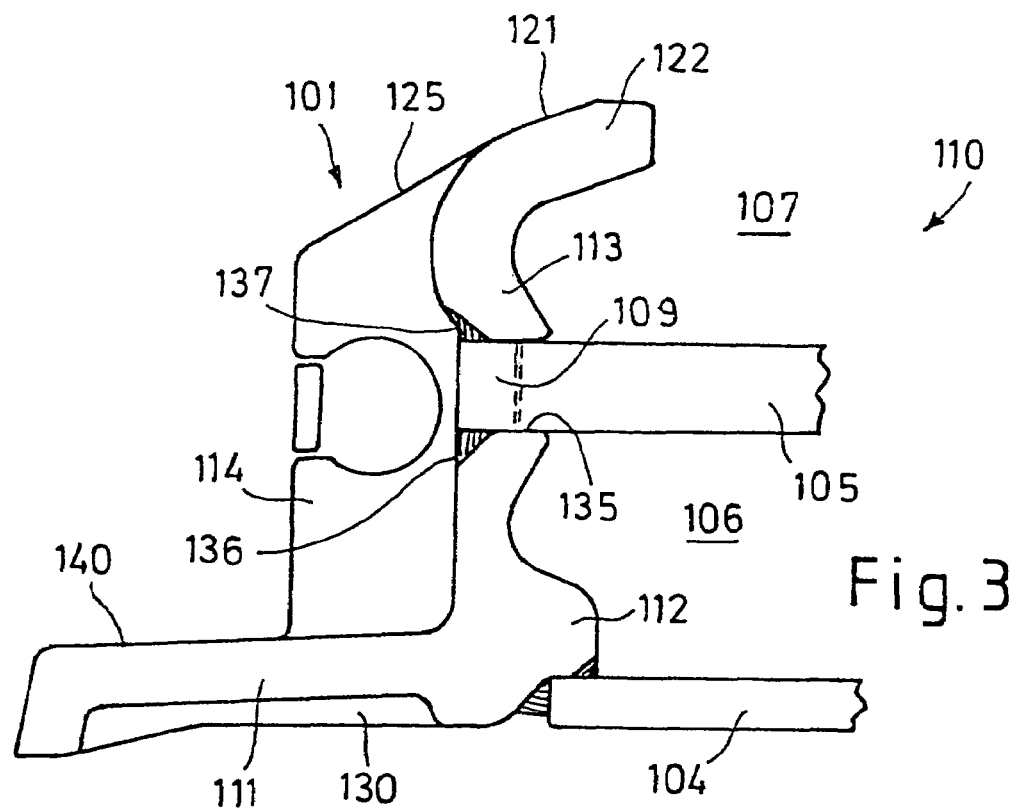
FIG. 3 shows a vertical section through a conveyor pan according to a third embodiment.

In the embodiment of the conveyor pan 110 shown in FIG. 3 only the side part 101 on the spoil side is shown, which comprises here a comparatively elongated approximately L-shaped cast flange arm 111, a comparatively short foot flange 112 and a vertical arm 113 manufactured with almost uniform profile thickness. The base plate 104 bordering the bottom run 106 to the bottom is welded below the foot flange 112 by means of long welded joints, and the weight reducing depressions 130 in the underside of the flange arm 111 can be easily seen. Here also the conveyor pan base 105 has segments 109 extending out over its ends, which engage through cut-out slots 135 in the vertical arm 113 of the side part 101 and are welded by means of the long welded seams 136, 137 to the outer side of the vertical arm 113. The acceptor pockets 114, which are cast onto all the end faces of the conveyor pan 110 are formed obliquely on their upper sides 125 and are flush with the top side 121 of the end section 122 of the vertical arm 113. The machine track is formed from the upper side 140 of the free section of the flange arm 111 extending out beyond the pocket acceptors 114.

Figure 4:
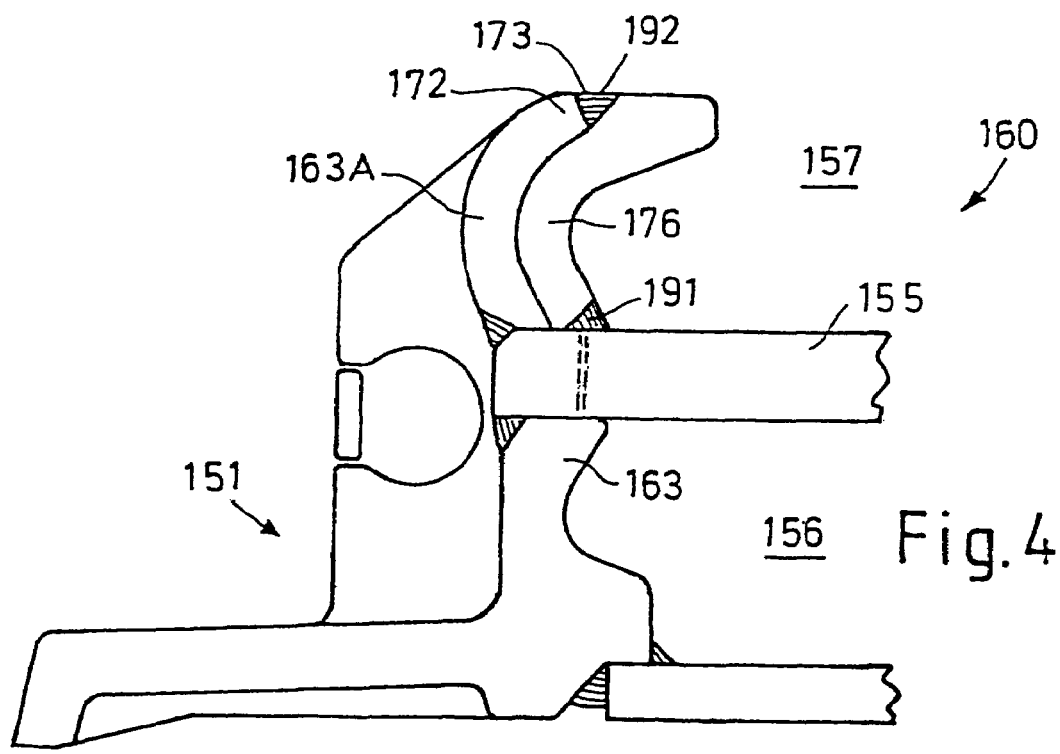
FIG. 4 shows a vertical section through a conveyor pan according to a fourth embodiment.

The conveyor pan 160 shown in FIG. 4 has essentially the same construction as the conveyor pan shown in FIG. 3. In contrast to the foregoing embodiment the top run 157 is bordered by a continuous wearing rail 176 comprising a rolled profile, which is welded using two long welded seams 191, 192 to the upper side of the conveyor pan base 155 and to the inner end surface 173 of the upper web end 172 of the upper section 163A of the vertical arm 163. This upper section 163A of the vertical arm 163 is displaced with respect to the lower, and is thicker than the section of the vertical arm 163 by the thickness of the profile rail 176, so that the guide channel formed from the side parts 151 for the scraper ends in the bottom run 156 and in the top run 157 have identical dimensions.

Figure 5:
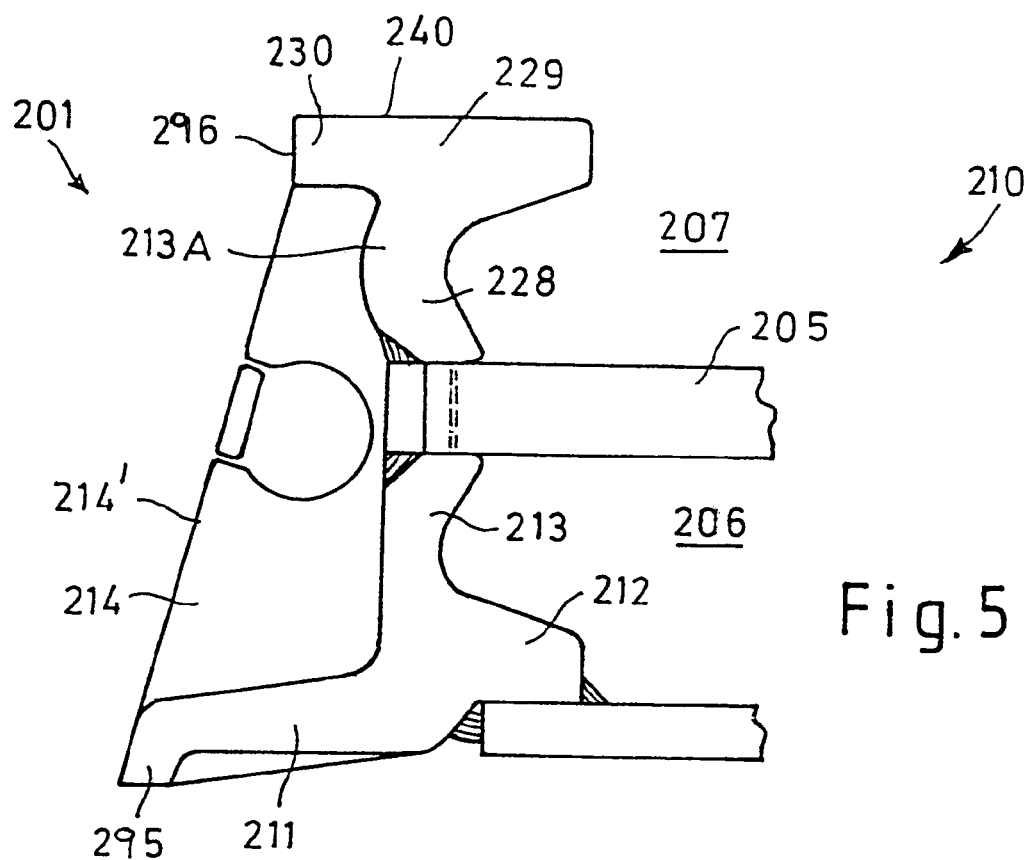
FIG. 5 shows a vertical section through a conveyor pan according to a fifth embodiment.

In the embodiment of the conveyor pan 210 as shown in FIG. 5 the top run 207 is bordered immediately by an integral section 213A of the vertical arm 213. The upper vertical arm section 213A has here a T-shaped cross section comprising the lower profile web 228 matched on its inside to the profile shape of the scraper ends and extending to the conveyor pan base 205 and the horizontal cross web 229, which extends relative to the profile web 228 both inwardly and also, with an extension 230, outwardly. The upper side 240 of the horizontal web 229 can form a machine track and the cast acceptance pocket 214 extends between the flange arm 211 and the attachment 230 in order additionally to support the machine track. The outer side 214' of the acceptance pocket 214 is formed obliquely, so that it makes a flush transition into the foot extension 295 on the flange arm 211 and into the outer end face 296 on the extension 230 of the horizontal arm 229. FIG. 5 shows as a deviation from the previous embodiments that the foot flange 212 can also extend comparatively far into the bottom run 206.

Figure 6:
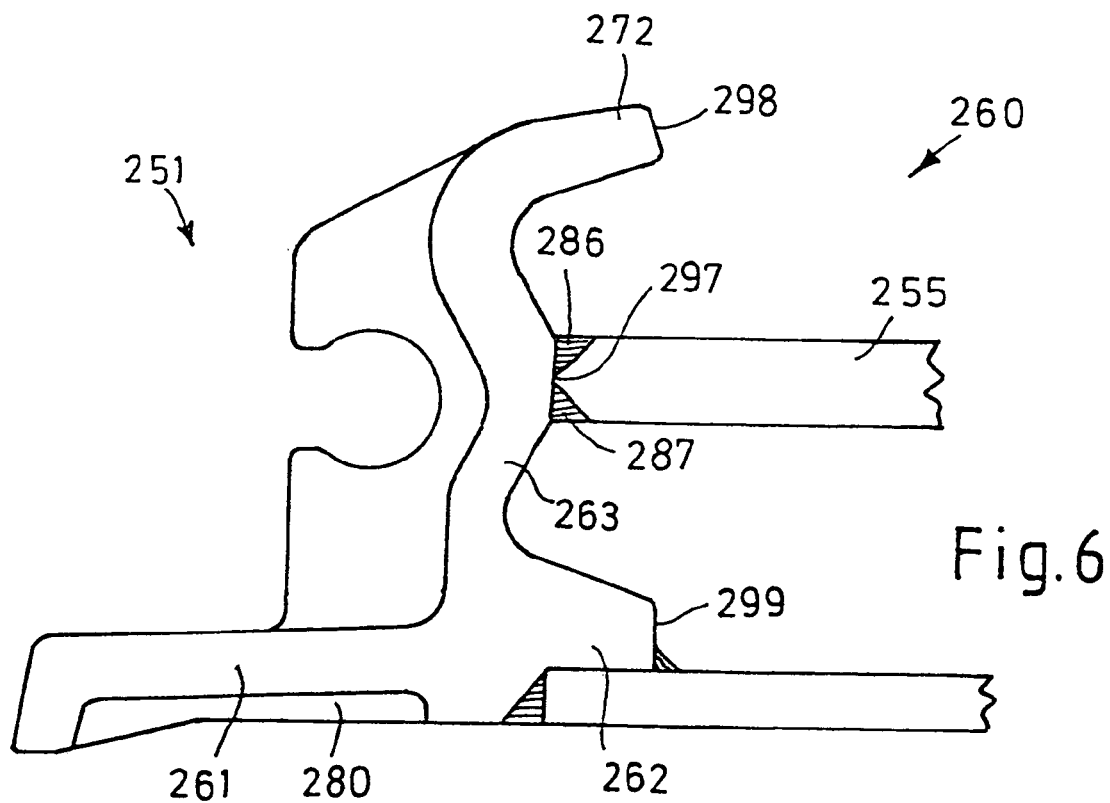
FIG. 6 shows a vertical section through a conveyor pan according to a sixth embodiment.

In the conveyor pan 260 shown in FIG. 6 with a side part 251 on the face side from a cast part shown here and a second identical and not shown side part on the spoil side the vertical arm 263 has a W-shaped profile in cross section and the conveyor pan base 255 is welded onto the crown 297 of this W-shaped cross section vertical arm 263. The long sides of the conveyor pan base 255 can come to a point be or be chamfered so as to provide favourable grooves for the long welded seams 286, 287 on the upper and lower sides. The long welded seams 286, 287 lie within the bottom and top runs. The thickness of the vertical arm 263 is approximately constant up to the inner end surface 298 on the upper web end 272 of the vertical arm 263 and the welding position of the conveyor pan base 255 to the crown 297 is displaced outwards as opposed to the upper and lower internal end surfaces 298, 299 of the web end 272 of the vertical arm and of the foot flange 262. An exchange of the conveyor pan base 255 then renews the entire lower guiding surface for the scrapers and the material being conveyed.

From the foregoing description a range of modifications present themselves to a man skilled in the art which fall within the scope of the attached claims. The dimensions, thicknesses and profile shapes of the individual cast parts can vary and additional weight reducing depressions can be provided.

The invention claimed is:

1. A conveyor pan for underground face or gate conveyors, with a pair of side parts consisting of cast parts which include cast vertical arms extending over the height of a bottom run and a top run, a lower cast flange arm extending outwards to the rear, a cast foot flange extending inwards onto whose lower side a base plate is welded which closes the bottom run to the bottom, cast accepting elements formed at end faces for joining conveyor pans, and a machine track which is an integral component of at least one of said cast vertical arms which said vertical arm has an end section with a T-shaped cross-section forming a cross web of said machine track, said side and top profiles are exchangeable welded onto said vertical arms adjacent said machine track, with said side and top profiles supported in steps formed in said vertical arms.

2. A conveyor pan according to claim 1, in which the conveyor pan base comprises a rolled sheet.

3. A conveyor pan according to claim 1, in which at least the side part on the face side is provided with a machine track for an extraction machine.

4. A conveyor pan according to claim 1, in which the side and top profiles comprise separate elements, whereby the top sides of the top profiles form a machine track.

5. A conveyor pan according to claim 1, in which the vertical arms have an end section with a T-shaped cross section or a step or similar, onto which a top profile abuts and is supported.

6. A conveyor pan according to claim 1, in which the accepting elements comprise open edged cast pockets.

7. A conveyor pan according to claim 1, in which the side parts are provided with cast vertical ribs for additional stiffening to the accepting pockets.

8. A conveyor pan according to claim 7, in which the vertical ribs are provided with cut-outs onto which lifting eyes or similar are fastened.

* * * * *